(No Model.) R., J., & O. PINTSCH. 3 Sheets—Sheet 1.
GAS LAMP.
No. 268,373. Patented Nov. 28, 1882.
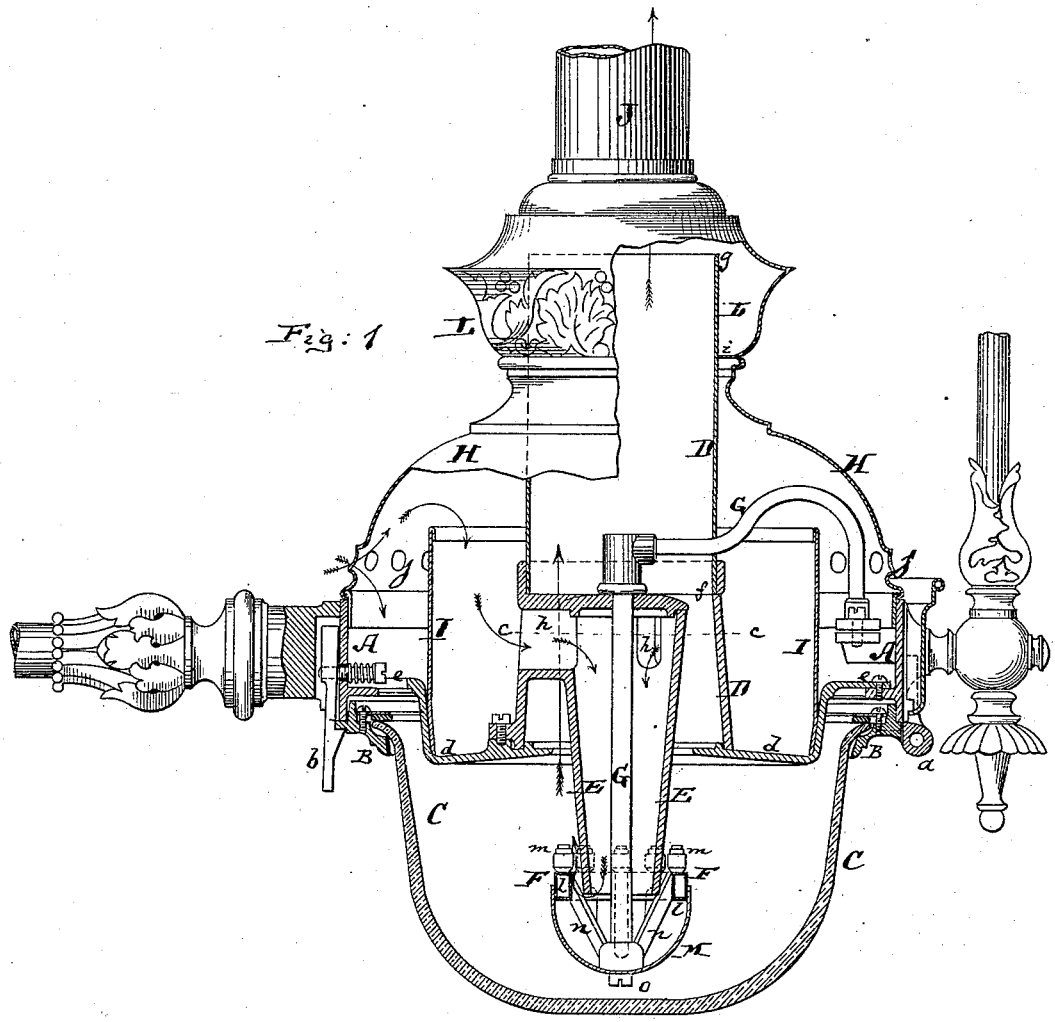

(No Model.) 3 Sheets—Sheet 2.
R., J., & O. PINTSCH.
GAS LAMP.
No. 268,373. Patented Nov. 28, 1882.
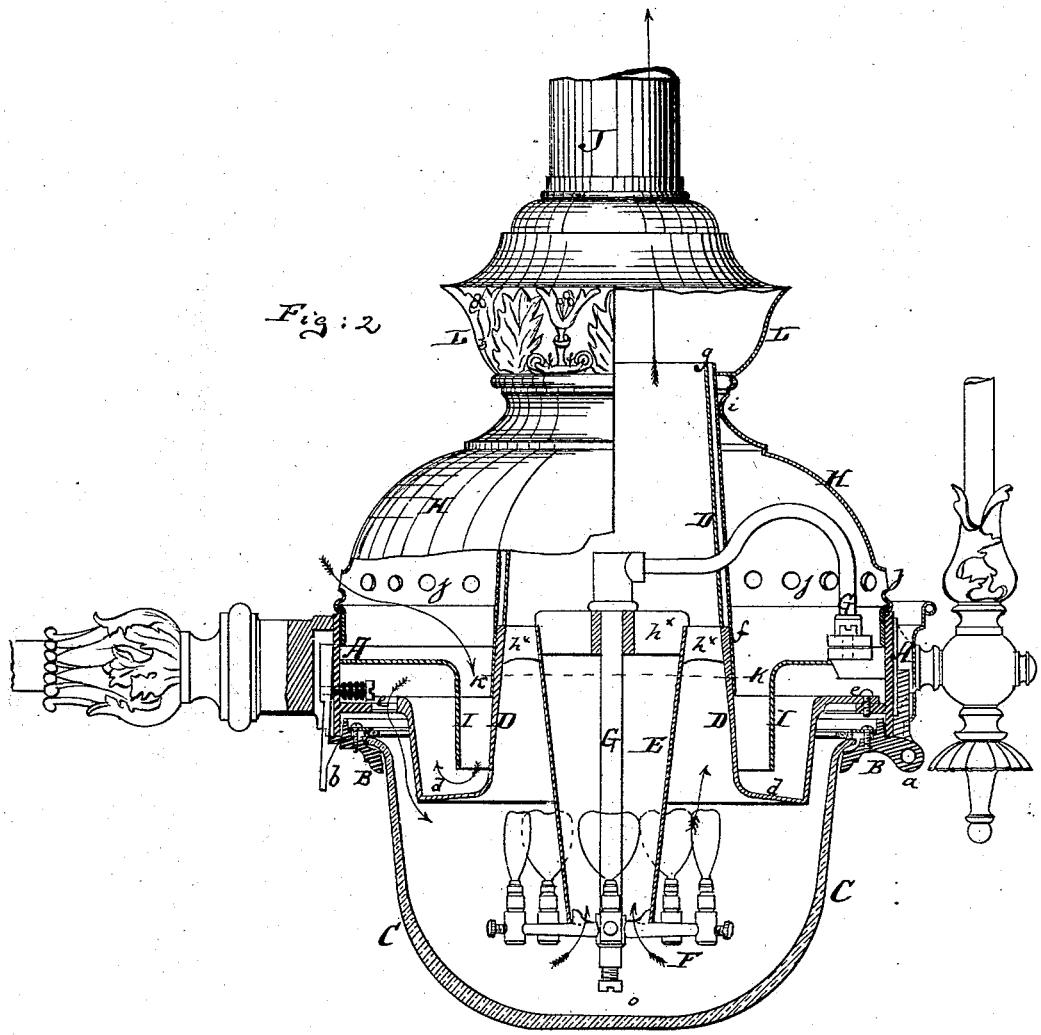

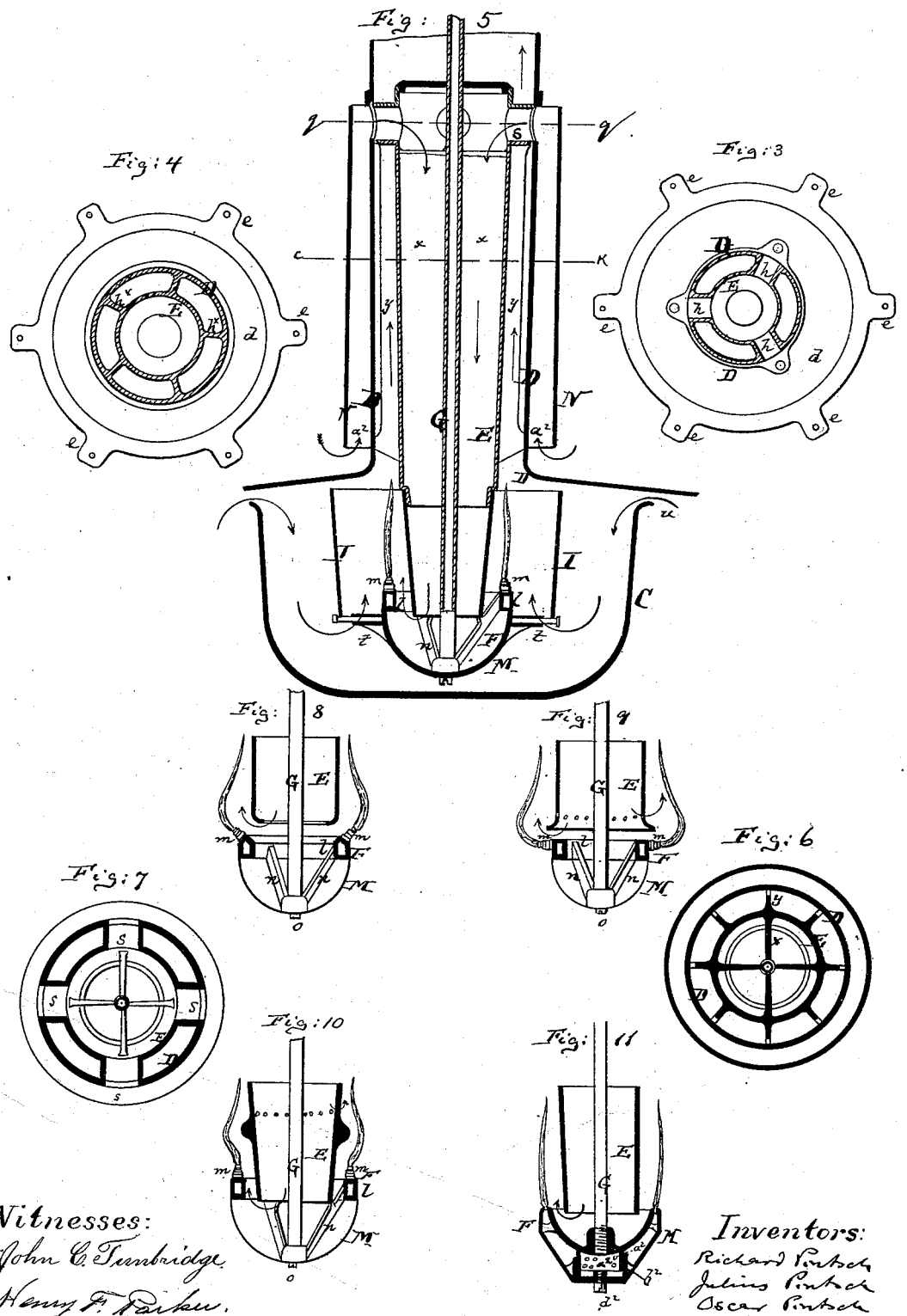

UNITED STATES PATENT OFFICE.

RICHARD PINTSCH, JULIUS PINTSCH, AND OSCAR PINTSCH, OF BERLIN, GERMANY.

GAS-LAMP.

SPECIFICATION forming part of Letters Patent No. 268,373, dated November 28, 1882.

Application filed April 15, 1882. (No model.)

*To all whom it may concern:*

Be it known that we, RICHARD PINTSCH, JULIUS PINTSCH, and OSCAR PINTSCH, (of the firm of Julius Pintsch,) subjects of the King of Prussia, residing at Berlin, Prussia, German Empire, have invented certain new and useful Improvements in Gas-Lamps; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a sectional elevation of our improved gas lamp; Fig. 2, a sectional elevation of a modification of the same; Fig. 3, a horizontal section on the line $c\ c$, Fig. 1; Fig. 4, a horizontal section on the line $k\ k$, Fig. 2; Fig. 5 is a vertical central section of another modification of the same. Fig. 6 is a horizontal section of the same on the line $c\ k$, Fig. 5. Fig. 7 is a horizontal section of the same on the line $q\ q$, Fig. 5. Figs. 8, 9, 10, and 11 are sectional views of different forms of burners used in our improved lamp.

This invention relates to a new construction of lamp for consuming hydrocarbon gas or coal-gas, which lamp is more particularly intended for use on railway-cars, street-lanterns, or in dwellings; and the invention consists in the new arrangement of the parts of a lamp proper, so far as the draft chambers or passages thereof are concerned, and also in a new construction of burner, as hereinafter more fully described.

In the drawings, with more particular reference to Figs. 1 and 3, the letter A represents the outer ring or body of the lamp, which ring may be made of cast-iron or other suitable material, and which is fastened by projecting brackets or directly in the framing that is to support the lamp.

To the ring A is hinged at $a$ the ring B, which supports the glass globe C, the said ring B being opposite to the hinge $a$ fastened to the ring A by suitable spring-catch, $b$. The glass globe C is suspended downwardly from the ring B, as shown.

In the ring A is secured the chimney D, which chimney rests on or near the inner edge of an annular plate, $d$, that is fastened by projecting lugs $e$ to the ring A, said lugs $e$ being shown in Fig. 3. The chimney D should be made with double walls or of double thickness between the points $f$ and $g$, as shown in Fig. 2, so that the space between the double walls of said chimney may be filled with mineral wool or equivalent non-conductor of heat.

Within the chimney is secured a pendent funnel, E, which is connected with the said chimney by radial braces $h$, at or near the upper end of the funnel E, the braces $h$ being tubular or hollow, as is shown in Figs. 1 and 3. The lower end of the funnel E extends downward below the chimney D to the burner F. The gas-supply pipe G enters the upper portion of the funnel E, and reaches down to the burner F through said funnel E, as shown. The burner-nipples are applied to the ring-shaped body of said burner outside of the funnel E, and not within the latter.

The hood H of the lamp fits the upper part of the ring A, and also hugs the chimney D at the point $i$. At its lower portion the hood H has series of small apertures $j$, as many in fact as are necessary to supply the flame or flames with sufficient air. The air that enters through the holes $j$ passes over a vertical ring, I, which surrounds the lower part of the chimney D, and is carried by the plate $d$ or by the ring A, and in the space thus embraced by the ring I the air entering is partly warmed. From this space the air passes through the tubes $h$ into the funnel E and down in said funnel to the burners, ascending along the outer side of the funnel as it reaches the burner-nipples. Some of the air, however, that enters through the apertures $j$ passes directly into the globe C through the spaces left between the lugs $e$, and thus counteracts any violence of current that might be caused by the air reaching the flame through the funnel E, thereby maintaining the flame steady. The products of combustion escape from this lamp into the chimney D and thence into an upper chimney, J, or, if there be no such upper chimney, through the perforated crown L. If there is an upper chimney J the perforated crown L will allow fresh air to enter near the upper part of the chimney D and assist in the draft.

The burner proper, which is intended to be illustrated in Fig. 1, is composed of an outer ring, $l$, which surrounds the lower part of the funnel E and carries the burner-nipples $m$. This hollow ring $l$ is connected by one or more hollow arms, $n$, with the gas-supply pipe G. A cup, M, is placed against the lower part of the ring $l$ to inclose the space within said ring from below, and serves to properly conduct the air that travels down through the funnel E to the flames and to prevent violent currents. The supply of gas to the burner can be regulated by a small cock, $o$, that is applied to the lower portion of the pipe G.

The modification which is shown in Fig. 2 differs from the structure shown in Fig. 1, principally in that the funnel E is not connected with the chimney D by tubular brackets $h$, but is in this case connected by solid brackets $h^{\times}$, in extensions of which the gas-pipe G also finds its guidance. This leaves the upper end of the funnel E open. The ring I in Fig. 2 is shown to be carried outward at its upper part into contact with the ring A, the result being that the air entering through the aperture $j$ passes into the space between the ring I and chimney D, down and up again above the bottom $d$, then down again through the apertures between the lugs into the bowl C, the products of combustion escaping directly into the chimney D and also into the funnel E, all as shown by arrows. This arrangement admits of a different form of burner being used beneath the funnel.

Fig. 3 shows a lantern made on a principle similar to that shown in Fig. 1; but in this modification the air enters at $a^2$ between an outer cylinder, N, and the inner chimney, D, passes upward through radial tubes $s$ into the upper portion of the funnel E that reaches down to the burner F, being surrounded at its lower part by the nipples $m$ of said burner. The gas is supplied to the burner by the pipe G. The ring $l$ of the burner F has the lower cup, M, and guides the air which enters through the funnel E to the flame, and thence up into the chimney-space formed outside of the funnel and within the chimney D. The currents of air from the outer side are neutralized by a cylinder, I, of glass or other transparent or translucent material, which cylinder is supported by brackets $t$, that project outward from the burner. The air from the outside enters the globe C through side openings $u$, goes down into the lower part of the globe, then up in the cylinder I, past the flame, and into the escape-channel formed between the parts E and D. Ribs $x$ are within the funnel E to assist in heating the air and to guide the pipe G, (see Fig. 6,) and there are outer ribs, $y$, to properly centralize the funnel E in the pipe D and to absorb the heat of the escaping gases.

In Figs. 8, 9, 10, and 11 are shown different forms of burners for use in this lamp. Fig. 8 shows the lower part of the funnel E slightly bent inward. Fig. 9 shows it partly bent outward; Fig. 10, partly conical, with outward bulge for bending the flame, and Fig. 11 straight or cylindrical. Either form is advantageous, according to different styles of burner and lamp employed.

In Figs. 9 and 10 are also shown small perforations in the funnel E for the purpose of distributing air more perfectly to the flame to induce perfect combustion. In Fig. 11 the gas-pipe G is shown to enter a chamber, $a^2$, having perforated walls, which chamber is partly inclosed in a surrounding jacket, $b^2$, that rests on the cup M, and that can be regulated up and down by a screw, $d^2$, to thereby adjust the amount of gas that passes through the apertures of the chamber $a^2$ to the burners.

In the construction shown in Fig. 2 the ring I may also be omitted.

I claim—

1. The combination of the funnel E, chimney D, and outer cylinder, I, all concentric to one another, substantially as described.

2. The combination of the funnel E, chimney D, gas-pipe G, burner F, and lower cup, M, substantially as specified.

3. The combination of the ring or frame A, globe-supporting ring B, globe C, and perforated cap H with the chimney D, funnel E, ring I, pipe G, and burner F, substantially as and for the purpose specified.

4. The funnel E, having air-supply passages $h$, combined with the chimney D, burner F, ring I, cap H, and globe C, substantially as described.

5. The burner F, placed beneath a funnel, E, and combined with the lower bowl, M, substantially as specified.

6. The annular diaphragm or plate $d$, having apertures for the admission of air, combined with the ring A, bowl C, cap H, chimney D, funnel E, and burner F, substantially as herein shown and described.

7. In a lamp having an annular burner, F, a funnel, E, having open ends and placed above the burner and within the annulars thereof, substantially as herein shown and described.

In testimony whereof we affix our signatures in presence of two witnesses.

RICHARD PINTSCH.
JULIUS PINTSCH.
OSCAR PINTSCH.

Witnesses:
GEORGE LOUBIER,
B. ROI.